US010160285B2

(12) United States Patent
Sato et al.

(10) Patent No.: US 10,160,285 B2
(45) Date of Patent: Dec. 25, 2018

(54) AIR-CONDITIONING APPARATUS FOR VEHICLE

(71) Applicant: Mitsubishi Electric Corporation, Chiyoda-ku, Tokyo (JP)

(72) Inventors: Masao Sato, Tokyo (JP); Kenichi Hashizume, Tokyo (JP); Junya Ogura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 14 days.

(21) Appl. No.: 15/542,220

(22) PCT Filed: Mar. 18, 2016

(86) PCT No.: PCT/JP2016/058655
§ 371 (c)(1),
(2) Date: Jul. 7, 2017

(87) PCT Pub. No.: WO2016/148272
PCT Pub. Date: Sep. 22, 2016

(65) Prior Publication Data
US 2018/0001733 A1    Jan. 4, 2018

(30) Foreign Application Priority Data
Mar. 18, 2015   (JP) .................. 2015-055194

(51) Int. Cl.
*B60H 1/00*      (2006.01)
*B60H 1/32*      (2006.01)
(Continued)

(52) U.S. Cl.
CPC ........... *B60H 1/00028* (2013.01); *B60H 1/00* (2013.01); *B60H 1/00371* (2013.01);
(Continued)

(58) Field of Classification Search
CPC .. B60H 1/00028; B60H 1/00; B60H 1/00371; B60H 1/00457; B60H 1/32;
(Continued)

(56) References Cited

U.S. PATENT DOCUMENTS 4,641,502 A * 2/1987 Aldrich ............. B60H 1/00378
454/136
4,672,818 A * 6/1987 Roth .................. B60H 1/00364
62/239
(Continued)

FOREIGN PATENT DOCUMENTS

JP    61-16156 A    1/1986
JP    02-009908 A   1/1990
(Continued)

OTHER PUBLICATIONS

International Search Report (PCT/ISA/210) dated Jun. 14, 2016, by the Japanese Patent Office as the International Searching Authority for International Application No. PCT/JP2016/058655.
(Continued)

*Primary Examiner* — Justin M Jonaitis
(74) *Attorney, Agent, or Firm* — Buchanan Ingersoll & Rooney PC

(57) ABSTRACT

An airflow direction plate elongated in a direction perpendicular to a direction of an air flow from an indoor fan is disposed between the indoor fan and an air supply duct opening. The airflow direction plate has air vents arranged in a longitudinal direction, inclined plates each disposed to a corresponding one of the air vents and having different angles of inclination corresponding to positions of the air vents, and an acoustic material disposed on a surface facing the indoor fan. An indoor unit has a first air passageway allowing the air from the indoor fan to flow in the longitudinal direction of the airflow direction plate for a detour to the air supply duct opening and a second air passageway (Continued)

allowing the air from the indoor fan to flow into the air vents along the inclined plates.

8 Claims, 8 Drawing Sheets

(51) Int. Cl.
*F28F 9/02* (2006.01)
*B61D 27/00* (2006.01)
*F24F 13/08* (2006.01)
*F24F 13/24* (2006.01)

(52) U.S. Cl.
CPC ........... *B60H 1/00457* (2013.01); *B60H 1/32* (2013.01); *B60H 1/3216* (2013.01); *B61D 27/00* (2013.01); *B61D 27/009* (2013.01); *B61D 27/0072* (2013.01); *B60H 2001/00235* (2013.01); *F24F 13/081* (2013.01); *F24F 13/24* (2013.01); *F28F 9/0278* (2013.01)

(58) Field of Classification Search
CPC ........ B60H 1/3216; B60H 2001/00235; B60H 1/00007; B60H 1/00035; B60H 1/00064; B60H 1/00357; B60H 1/00364; B60H 1/00407; B60H 1/00414; B61D 27/00; B61D 27/0072; B61D 27/009; F24F 13/081; F24F 13/24; F24F 1/00; F24F 3/00; F24F 7/00; F24F 7/013; F24F 11/0001; F24F 13/08; F28F 9/0278
See application file for complete search history.

(56) References Cited

U.S. PATENT DOCUMENTS

| | | | | |
|---|---|---|---|---|
| 5,632,330 A | * | 5/1997 | Drucker | B60H 1/00321 |
| | | | | 165/125 |
| 5,791,156 A | * | 8/1998 | Strautman | B60H 1/00364 |
| | | | | 296/38 |
| 5,967,224 A | | 10/1999 | Iwanaga et al. | |
| 6,796,132 B1 | * | 9/2004 | Hille | B60H 1/00371 |
| | | | | 454/139 |
| 2010/0120345 A1 | * | 5/2010 | Ryan | B60H 1/00371 |
| | | | | 454/75 |
| 2015/0273982 A1 | * | 10/2015 | Takata | B60H 1/00778 |
| | | | | 701/48 |

FOREIGN PATENT DOCUMENTS

| | | |
|---|---|---|
| JP | 02-133223 A | 5/1990 |
| JP | 10-071835 A | 3/1998 |
| JP | 2007-203888 A | 8/2007 |
| JP | 2007-253693 A | 10/2007 |
| JP | 2009-190495 A | 8/2009 |

OTHER PUBLICATIONS

Written Opinion (PCT/ISA/237) dated Jun. 14, 2016, by the Japanese Patent Office as the International Searching Authority for International Application No. PCT/JP2016/058655.

* cited by examiner

AIR-CONDITIONING APPARATUS FOR VEHICLE

TECHNICAL FIELD

The present invention relates to an air-conditioning apparatus for a vehicle with which, for example, a railway vehicle is equipped.

BACKGROUND ART

An air-conditioning apparatus 1 for a railway vehicle (referred to below as an "air-conditioning apparatus 1") that is mounted on a roof 51 of a railway vehicle 50, as illustrated in FIG. 11, is one of conventional air-conditioning apparatuses for a vehicle. During cooling operation, cold air 1a is sent to a vehicle interior 52 via air supply ducts 2 in communication with the air-conditioning apparatus 1. Circulating air 1b that has circulated through the vehicle interior 52 is sucked from return ducts 3 disposed between the vehicle 50 and the air-conditioning apparatus 1 into a return inlet 4 (see FIG. 12) and flows into the air-conditioning apparatus 1.

As illustrated in, for example, FIG. 12 and FIG. 13, the air-conditioning apparatus 1 is typically formed of an outdoor unit 9 and an indoor unit 5 and mounted on the roof 51 of the vehicle 50. The outdoor unit 9 and the indoor unit 5 are each equipped with air-conditioning equipment for ensuring the performance of air-conditioning. Air-conditioning equipment required for a refrigeration cycle, such as an outdoor fan 11, a condenser 12, which is an outdoor heat exchanger, a compressor 13, a pipe, and a wiring (not illustrated), is disposed in a housing 10 of the outdoor unit 9. Air-conditioning equipment, such as an indoor fan 7, an evaporator 8, which is an indoor heat exchanger, a return damper for adjusting the amount of air, a fresh damper, a controller, and a heater using an electric heat source, although these components are not illustrated, is disposed in a housing 6 of the indoor unit 5.

The flow of air inside the indoor unit 5 of the conventional air-conditioning apparatus 1 will be described. Inside the indoor unit 5, the indoor fan 7 is operated to suck air from the vehicle interior 52 into the indoor unit 5 via the return ducts 3, although this configuration is not illustrated. The sucked air passes through a dust collection filter, the evaporator 8, the indoor fan 7, and the heater in this order and subsequently returns to the vehicle interior 52 from an air supply duct opening. The circulating air 1b flows back into the indoor unit 5 again. Fresh air drawn from outdoor air into the indoor unit 5 flows to the vehicle interior 52 from the air supply duct opening as in the flow of the circulating air 1b.

As well as the air-conditioning apparatus for a railway vehicle, the conventional air-conditioning apparatus 1 includes an air-conditioning apparatus for a motor vehicle. As illustrated in FIG. 14, a defroster of this air-conditioning apparatus for a motor vehicle causes air that has passed through a defroster air communication hole 60 to be sucked from an air suction port 62 of a box-shaped housing 61. The air passes through holes 63a of a U-shaped airflow direction plate 63 and blows as a jet of airflow 65 upward from the lower portion of a windshield 64 along a windshield surface, and hence condensation is removed. The size of the holes 63a gradually increases with an increase in the distance from the defroster air communication hole 60 in the longitudinal direction. A small amount of air is sucked from the hole 63a close to the air suction port 62, and a large amount of air is sucked from the large hole 63a on the opposite side. After the air blows from the U-shaped airflow direction plate 63, a pressure gradient in a space 77 partitioned by a partition plate 76 decreases, and condensation on the inner surface of the windshield 64 is removed from the entire surface. A noise of a vehicle engine coming from the defroster air communication hole 60 directly reaches the vehicle interior from the air suction port 62 of the box-shaped housing 61 via the holes 63a of the U-shaped airflow direction plate 63 (see, for example, Patent Literature 1).

The air-conditioning apparatus for a motor vehicle includes an air-conditioning apparatus for a motor vehicle that adjusts the amount of air using an airflow direction plate with a drive unit. As illustrated in FIG. 15, in this air-conditioning apparatus for a motor vehicle, the amount of cooling air and the amount of heating air are adjusted by rotating an airflow direction plate 70 for a motor vehicle using a servomotor to change the flow of air passing through a cooling bypass air passageway 73 extending from a fan 71 for a motor vehicle toward a cooling heat exchanger 72 and the flow of air passing through a heating air passageway 75 in a heater 74 for a motor vehicle (see, for example, Patent Literature 2).

CITATION LIST

Patent Literature

Patent Literature 1: Japanese Unexamined Patent Application Publication No. 61-16156 (FIG. 3)
Patent Literature 2: Japanese Unexamined Patent Application Publication No. 2007-203888 (FIG. 1)

SUMMARY OF INVENTION

Technical Problem

In the indoor unit 5 of the air-conditioning apparatus 1 illustrated in FIG. 12 and FIG. 13, the distance between the air supply duct openings connected to the air supply ducts 2 and the indoor fan 7 are short, although this configuration is not illustrated. Consequently, the sound of air sent from the indoor fan 7 becomes a noise and is transmitted to the vehicle interior 52.

According to Patent Literature 1, an airflow direction plate having small circular holes and large circular holes for adjusting the amount of air is disposed on the midway of an air passageway, and the amount of air is adjusted by a difference in the size of the circular holes to increase the effect of adjusting the amount of air and reduce a variation in the amount of air. With this configuration, however, the distance from the defroster air communication hole to the airflow direction plate is short, and consequently, a reduction in a noise of an engine in the vehicle interior cannot be expected, although the amount of air can be adjusted. That is, the noise cannot be reduced even when the airflow direction plate with the holes is disposed on the midway of the air passageway, because energy of a sound transmitted through air decreases inversely proportional to the cube of a distance.

According to Patent Literature 2, the amount of air is adjusted while the airflow direction plate is moved using the drive unit. With this configuration, however, a space for the servomotor is needed, no components can be disposed within the range in which the airflow direction plate 70 for a motor vehicle is movable, and the drive unit cannot be compact.

The present invention has been accomplished to solve the above problems and provides an air-conditioning apparatus for a vehicle that enables a reduction in the noise of the air-conditioning apparatus for a vehicle, a guarantee of the amount of cold air and hot air, and the compactification and cost reduction of the air-conditioning apparatus for a vehicle.

Solution to Problem

An air-conditioning apparatus for a vehicle according to an embodiment of the present invention includes an indoor unit including an evaporator, an indoor fan, a return inlet from which air from the vehicle is drawn, and an air supply duct opening through which the air is supplied to the vehicle and configured to operate the indoor fan to cause the air in the vehicle to flow from the return inlet to the evaporator and send the air passing through the evaporator to the air supply duct opening, an outdoor unit including a compressor, a condenser, and an outdoor fan and configured to form a refrigeration cycle together with the indoor unit, and an airflow direction plate elongated in a direction perpendicular to a direction of an air flow from the indoor fan and disposed between the indoor fan in the indoor unit and the air supply duct opening. The airflow direction plate has air vents arranged in a longitudinal direction, inclined plates each disposed to a corresponding one of the air vents, having different angles of inclination corresponding to positions of the air vents, and adjusting an amount and a speed of the air from the indoor fan, and an acoustic material disposed on a surface facing the indoor fan. The indoor unit has a first air passageway allowing the air from the indoor fan to flow in the longitudinal direction of the airflow direction plate for a detour to the air supply duct opening and a second air passageway allowing the air from the indoor fan to flow into the air vents along the inclined plates.

Advantageous Effects of Invention

According to an embodiment of the present invention, the airflow direction plate is disposed between the indoor fan and the air supply duct opening, the airflow direction plate has the air vents and the inclined plates that have different angles of inclination corresponding to the positions of the air vents, and the acoustic material is disposed on the surface of the airflow direction plate facing the indoor fan. With this configuration, a noise of the sound of air that is directly transmitted from the indoor fan can be reduced. In addition, air turbulence can be prevented by adjusting the amount of air using the airflow direction plate, and the airflow can be regulated. Consequently, an aerodynamic noise can be reduced, and in addition to the effect of the acoustic material attached to the airflow direction plate, noises produced from the fan can be reduced on the whole.

In addition, the amount of air can be adjusted and the airflow can be regulated, using the second air passageway in the indoor unit, and consequently, the balance of the amount of air and a predetermined amount of air can be ensured at the position of the air supply duct opening at which the first air passageway and the second air passageways merge with each other. Furthermore, a noise directly transmitted from the indoor fan is greatly reduced by the airflow direction plate, and consequently, the noise at the air supply duct opening can be reduced as much as possible. In addition, the amount of air is not adjusted by the indoor fan but is adjusted by the shape of the airflow direction plate. Consequently, the air-conditioning apparatus for a vehicle can be compact, and its costs can be reduced.

DESCRIPTION OF EMBODIMENTS

Figure 12:
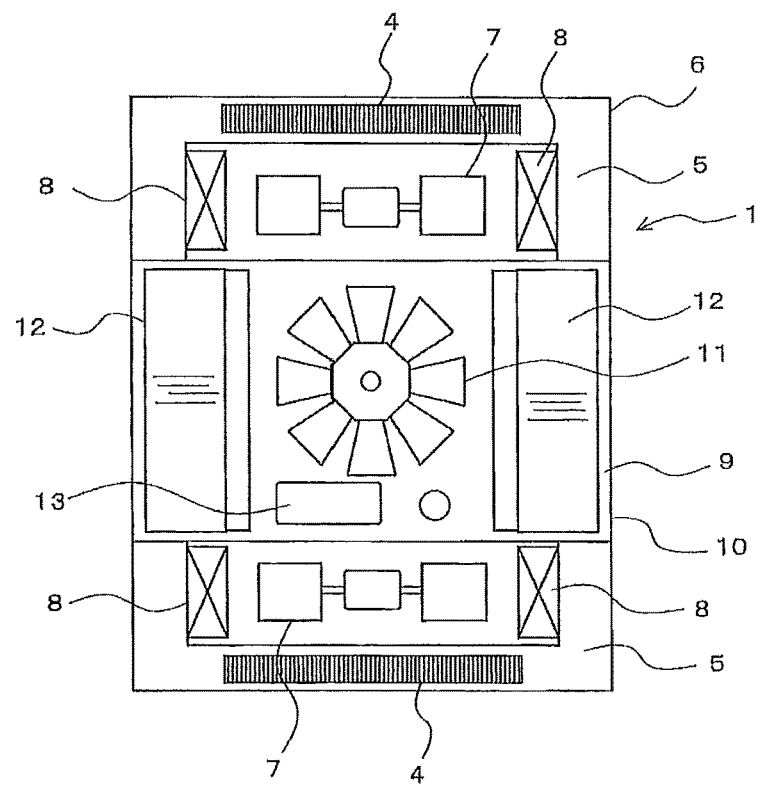
FIG. 12 is a plan view of the conventional air-conditioning apparatus for a vehicle.
Figure 13:
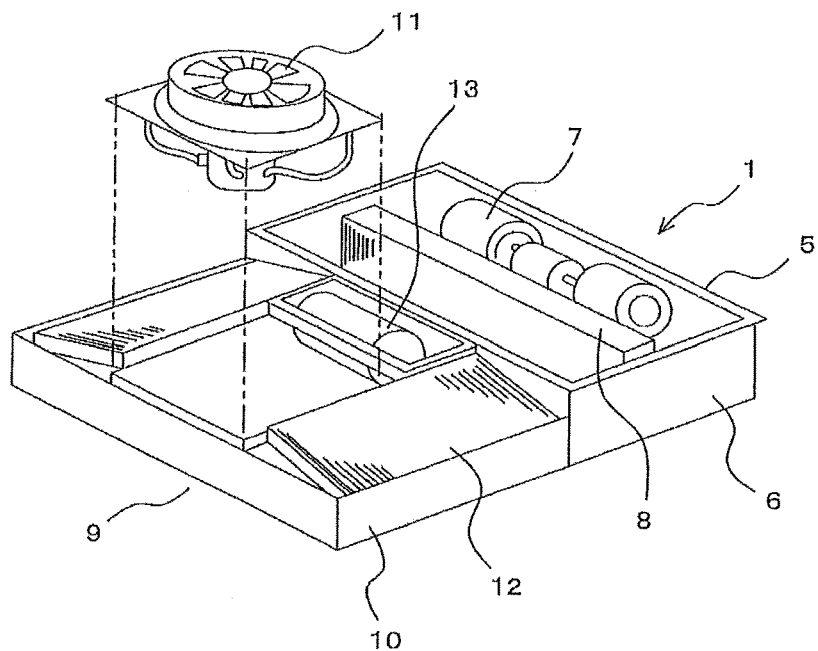
FIG. 13 is a perspective view of the conventional air-conditioning apparatus for a vehicle.
Figure 14:
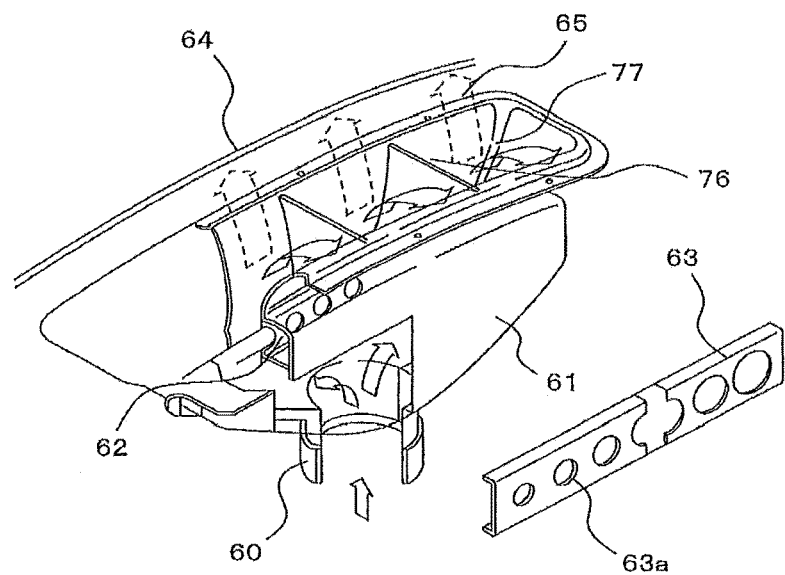
FIG. 14 is a perspective view of a conventional air-conditioning apparatus for a vehicle illustrating the flow of air in a defroster.
Figure 15:
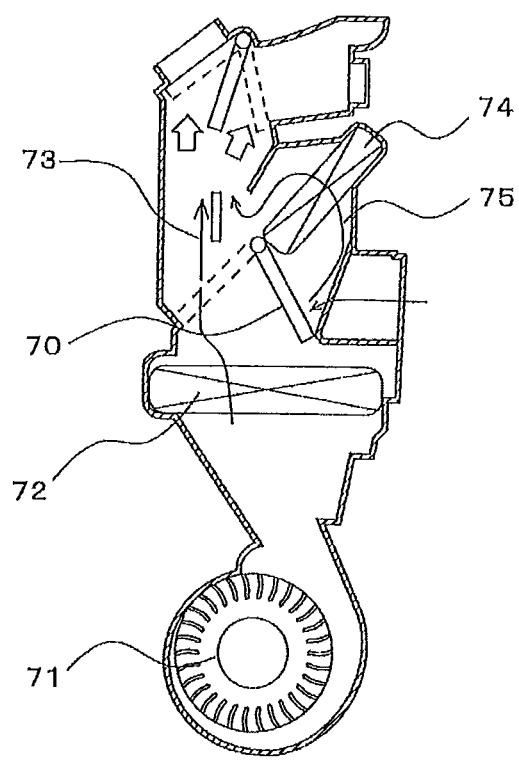
FIG. 15 is a schematic view of an indoor unit of a conventional air-conditioning apparatus for a vehicle.

Embodiments of an air-conditioning apparatus for a vehicle according to the present invention will hereinafter be described. The air-conditioning apparatus for a vehicle is, for example, an air-conditioning apparatus mounted on the roof of a railway vehicle. Except for an indoor unit, an outdoor unit similar to the outdoor unit illustrated in FIG. 12 or FIG. 13 is used.

Embodiment 1

The configuration of the indoor unit of an air-conditioning apparatus for a vehicle according to Embodiment 1 will be described below with reference to FIG. 1 and FIG. 2.

Figure 1:
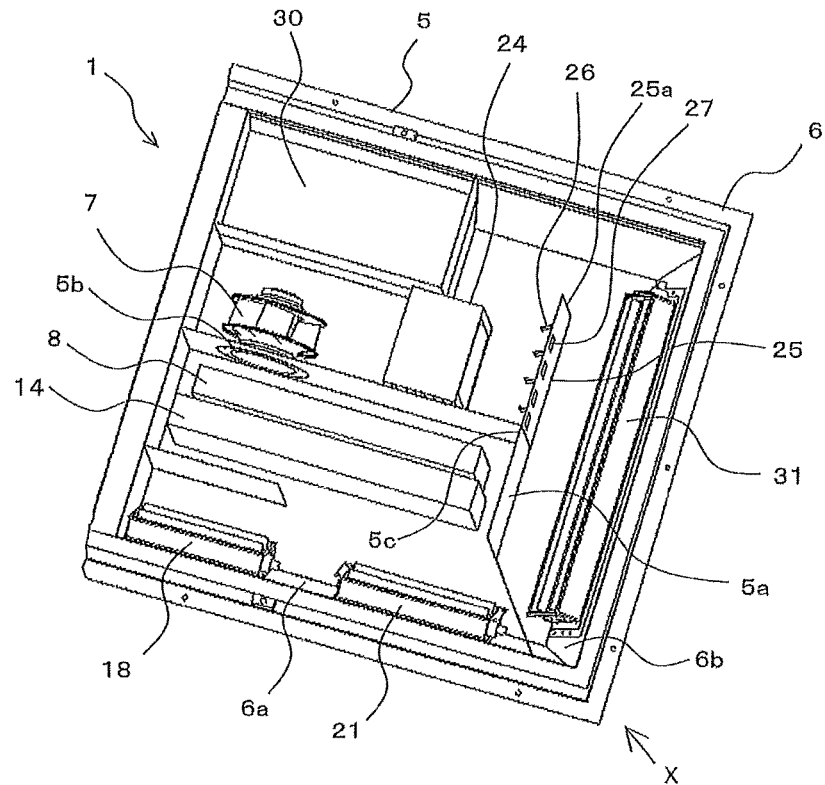
FIG. 1 is a perspective view of an indoor unit of an air-conditioning apparatus for a vehicle according to Embodiment 1 of the present invention.
Figure 2:
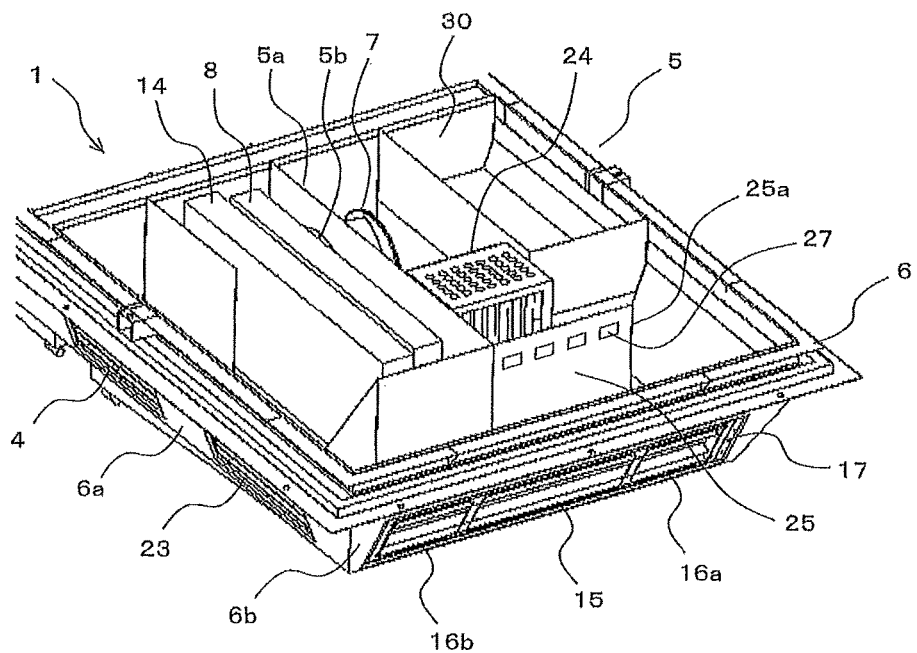
FIG. 2 is a perspective view of the indoor unit in FIG. 1 viewed from the direction of an arrow X.
Figure 11:
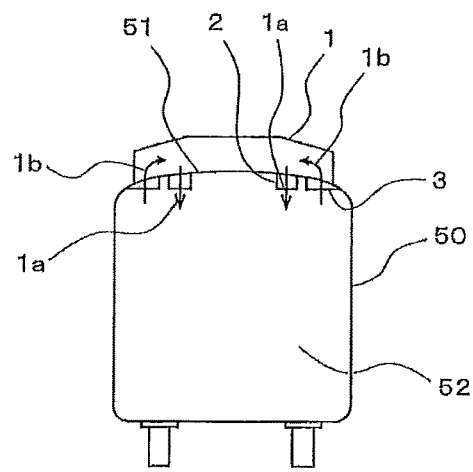
FIG. 11 is a schematic side view of the relationship between a conventional air-conditioning apparatus for a vehicle and a railway vehicle.

FIG. 1 is a perspective view of the indoor unit of the air-conditioning apparatus for a vehicle according to Embodiment 1 of the present invention. FIG. 2 is a perspective view of the indoor unit in FIG. 1 viewed from the direction of an arrow X. The same portions as or corresponding portions to conventional portions in FIG. 11 and FIG. 12 are designated by the same reference signs.

In an indoor unit 5 of an air-conditioning apparatus 1 for a vehicle, two storage rooms are separated by a partition plate 5a disposed in a housing 6. In one of the storage rooms, for example, an evaporator 8, which is an indoor heat exchanger, and a dust collection filter 14 that collects dust are disposed. In the other storage room, for example, an indoor fan 7, a heater 24 that generates heat using electricity, and an electrical box 30 that accommodates an electrical component for controlling, for example, the indoor fan 7 and the heater 24 are disposed. An inlet 5b is opened through a surface of the partition plate 5a facing the indoor fan 7.

A return damper 18 that adjusts the amount of air returning from a vehicle interior and an outdoor-air drawing damper 21 that adjusts the amount of outdoor air (fresh air) to be drawn into the indoor unit 5 are disposed on a side plate 6a of side plates of the housing 6 that faces the dust collection filter 14. As illustrated in FIG. 2, a return inlet 4 is formed in the side plate 6a and corresponds to the return damper 18, and an outdoor-air inlet 23 is formed in the side plate 6a and corresponds to the outdoor-air drawing damper 21.

An air supply damper 31 that adjusts the amount of air to be supplied to the vehicle interior is disposed on a side plate 6b of the side plates of the housing 6 that faces an airflow direction plate 25, which will be described later. The air supply damper 31 is formed of a cooling damper 31a disposed at the center and two heating dampers 31b disposed on both sides of the cooling damper 31a (see FIG. 3). As illustrated in FIG. 2, an air supply duct opening 17 is formed in the side plate 6b and corresponds to the air supply damper 31. The air supply duct opening 17 is formed of a cooling duct opening 15 corresponding to the cooling damper 31a and first and second heating duct openings 16a and 16b corresponding to the respective two heating dampers 31b. The air supply duct opening 17 is in communication with air supply ducts 2 through which air is supplied to the vehicle interior.

The airflow direction plate 25 connected to a corner 5c of the partition plate 5a is disposed in the housing 6. The airflow direction plate 25 is disposed to be parallel to and face the air supply damper 31 and has air vents 27 arranged in the longitudinal direction. Inclined plates 26 that guide a part of air from the indoor fan 7 to the respective air vents 27 are each disposed to a corresponding one of the air vents 27. Among the inclined plates 26, the inclined plate 26 closest to an end portion 25a of the airflow direction plate 25 inclines at the smallest angle, and the inclined plate 26 closest to the corner 5c of the partition plate 5a inclines at a large angle of 90 degrees. The angle of inclination of the other inclined plates 26 at the center gradually increases from the side of the end portion 25a of the airflow direction plate 25. The angle of inclination of the inclined plates 26 is an angle from the airflow direction plate 25. An acoustic material 32 (see FIG. 6) that absorbs the sound of air sent from the indoor fan 7 is attached to the surface of the airflow direction plate 25 that faces the heater 24, that is, the surface below the air vents 27.

Cooling operation of the air-conditioning apparatus 1 for a vehicle according to Embodiment 1 will be described below.

High-temperature, high-pressure gas refrigerant is discharged from a compressor, not illustrated, in the outdoor unit. The gas refrigerant enters the condenser (outdoor heat exchanger), is cooled and condensed by air blown from the outdoor fan, and progressively liquefies. The liquid refrigerant is expanded by an expansion valve, becomes low-temperature, low-pressure two-phase gas-liquid refrigerant, and enters the evaporator 8 (indoor heat exchanger) in the indoor unit 5. Heat is exchanged between the two-phase gas-liquid refrigerant that has entered the evaporator 8 and air sucked by operating the indoor fan 7, and the two-phase gas-liquid refrigerant evaporates and is sucked into the compressor 13. The compressor 13 changes the sucked gas refrigerant into high-temperature, high-pressure gas refrigerant. The refrigerant repeatedly circulates. During cooling operation, the air sucked by the indoor fan 7 becomes cold air in the evaporator 8 and is sent toward the heater 24, which is switched off.

The flow of air in the indoor unit 5 during cooling operation will be described below with reference to FIG. 3.

Figure 3:
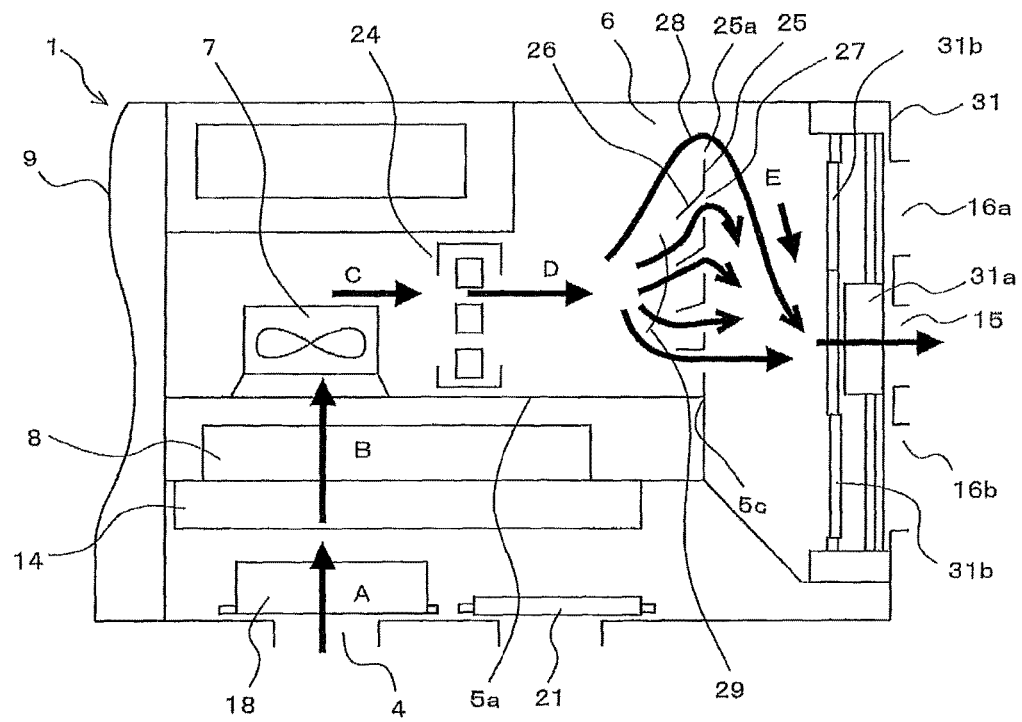
FIG. 3 is a plan view of the air-conditioning apparatus for a vehicle according to Embodiment 1 of the present invention illustrating the flow of circulating air in the indoor unit during cooling operation.

FIG. 3 is a plan view of the air-conditioning apparatus for a vehicle according to Embodiment 1 of the present invention illustrating the flow of circulating air 1b in the indoor unit during cooling operation. During cooling operation, as illustrated in the figure, the cooling damper 31a disposed at the center of the air supply damper 31 opens to the cooling duct opening 15. The two heating dampers 31b disposed on both sides of the cooling damper 31a close the corresponding first and second heating duct openings 16a and 16b.

The indoor fan 7 is operated to suck the circulating air 1b flowing from the vehicle interior 52 in a direction A via the return inlet 4 in response to adjustment of the amount of air by the return damper 18. The circulating air 1b that has passed through the return damper 18 passes through the dust collection filter 14, and hence dust is collected. Heat is exchanged between the circulating air 1b and the evaporator 8, which is cooled, and the circulating air 1b becomes cold air 1a. The cold air 1a passes through the inlet 5b and is sucked in a direction B. The cold air 1a is discharged in a direction C by the indoor fan 7, passes through the heater 24, which is switched off, and is sent in a direction D. The cold air 1a is subsequently dispersed by the airflow direction plate 25 to a first air passageway 28 and second air passageways 29. At this time, the sound of the air sent from the indoor fan 7 is absorbed by the acoustic material 32 attached to the airflow direction plate 25.

The cold air 1a on the first air passageway 28 flows in the longitudinal direction of the airflow direction plate 25. When the cold air 1a reaches the end portion 25a of the airflow direction plate 25, the cold air 1a comes in contact with a side plate of the housing 6 and veers in a direction E. The inclined plates 26 disposed on the airflow direction plate 25 cause the cold air 1a on each of the second air passageways 29 to pass through a corresponding one of the air vents 27, and the cold air 1a flows from the cooling damper 31a to the cooling duct opening 15. In this case, the cold air 1a that has passed through each of the air vents 27 from a corresponding one of the second air passageways 29 joins the cold air 1a that has veered in the direction E from the first air passageway 28, flows from the cooling duct opening 15 via the cooling damper 31a, and is sent to the vehicle interior 52 via the air supply ducts 2.

The flow of air in the indoor unit 5 during heating operation will be described below with reference to FIG. 4.

Figure 4:
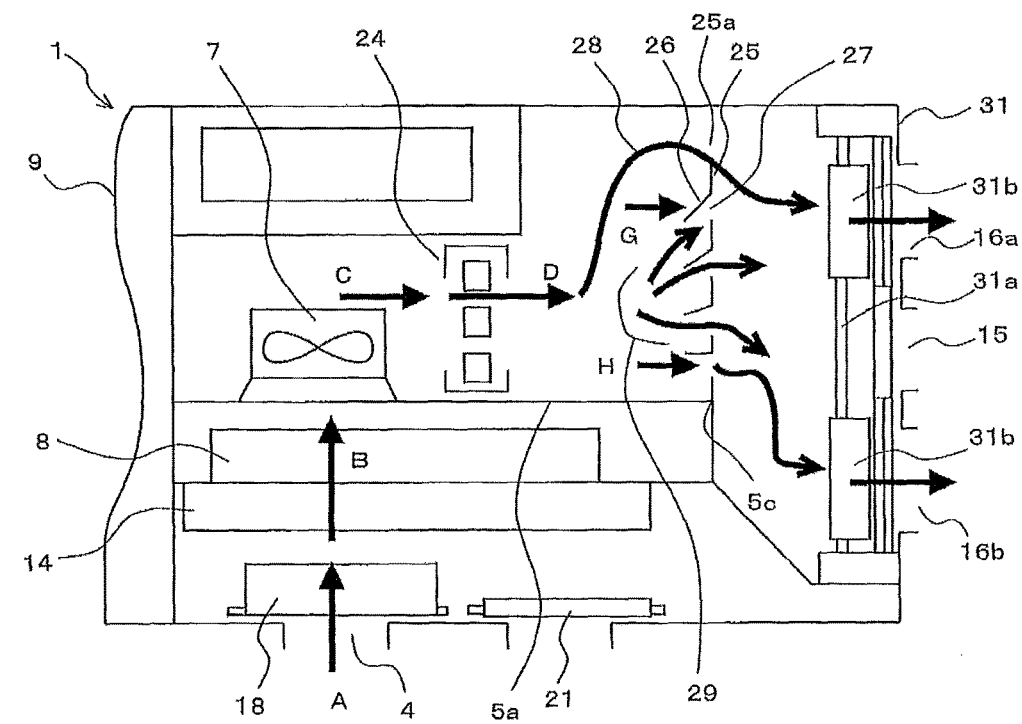
FIG. 4 is a plan view of the air-conditioning apparatus for a vehicle according to Embodiment 1 of the present invention illustrating the flow of circulating air in the indoor unit during heating operation.

FIG. 4 is a plan view of the air-conditioning apparatus for a vehicle according to Embodiment 1 of the present invention illustrating the flow of the circulating air 1b in the indoor unit during heating operation. During heating operation, as illustrated in the figure, the cooling damper 31a of the air supply damper 31 closes the cooling duct opening 15. The two heating dampers 31b open to the first and second heating duct openings 16a and 16b.

During heating operation, the circulating air 1b from the vehicle interior 52 is sucked in the direction A via the return inlet 4 in response to adjustment of the amount of air by the return damper 18, as in the case of cooling operation. The circulating air 1b that has passed through the return damper 18 passes through the dust collection filter 14, and hence dust is collected. Heat is exchanged between the circulating air 1b and the evaporator 8, which is cooled, and the circulating air 1b becomes the cold air 1a. The cold air 1a passes through the inlet 5b and is sucked in the direction B. The cold air 1a is discharged in the direction C by the indoor fan 7, passes through the heater 24 generating heat, is superheated, and becomes hot air 1c. The hot air 1c is sent in the direction D. The hot air 1c is dispersed by the airflow direction plate 25 to the first air passageway 28 and the second air passageways 29. At this time, the sound of the air sent from the indoor fan 7 is absorbed by the acoustic material 32 attached to the airflow direction plate 25.

The hot air 1c on the first air passageway 28 flows in the longitudinal direction of the airflow direction plate 25. When the hot air 1c reaches the end portion 25a of the airflow direction plate 25, the hot air 1c comes in contact with a side plate of the housing 6 and veers in the direction E (see FIG. 3). The inclined plates 26 disposed on the airflow direction plate 25 cause the hot air 1c on each of the second air passageways 29 to pass through a corresponding one of the air vents 27, and the hot air 1c flows from the two heating dampers 31b to the first and second heating duct openings 16a and 16b. In this case, the hot air 1c that has passed through each of the air vents 27 from a corresponding one of the second air passageways 29 joins the hot air 1c that has veered in the direction E from the first air passageway 28 and flows from the first and second heating duct openings 16a and 16b via the two heating dampers 31b. The hot air 1c joins together in each of the air supply ducts 2 and is sent to the vehicle interior 52.

The flow of air in the indoor unit 5 during air sending operation will be described below with reference to FIG. 5.

Figure 5:
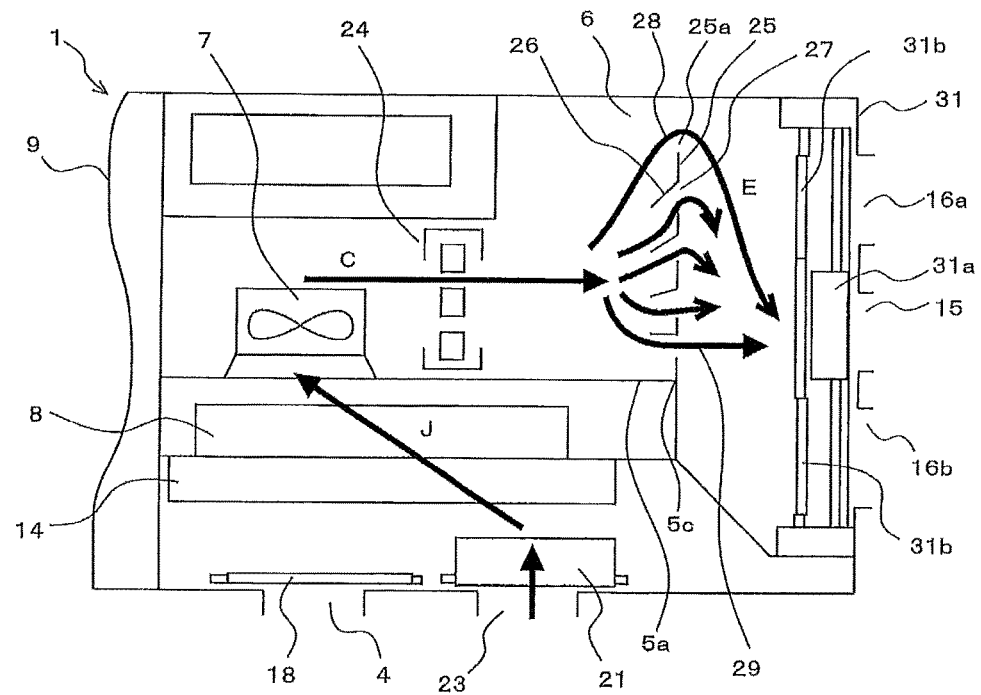
FIG. 5 is a plan view of the air-conditioning apparatus for a vehicle according to Embodiment 1 of the present invention illustrating the flow of outdoor air in the indoor unit during air sending operation.

FIG. 5 is a plan view of the air-conditioning apparatus for a vehicle according to Embodiment 1 of the present invention illustrating the flow of outdoor air in the indoor unit during air sending operation. During air sending operation, the outdoor-air drawing damper 21 opens. The cooling damper 31a opens to the cooling duct opening 15. The two heating dampers 31b close the first and second heating duct openings 16a and 16b.

The indoor fan 7 is operated to suck outdoor air in a direction J from the outdoor-air drawing damper 21 and to cause the air to pass through the dust collection filter 14, and hence dust is collected. The air (fresh air) from which dust is collected passes through the inlet 5b via the evaporator 8, is discharged in the direction C by the indoor fan 7, and passes through the heater 24, which is switched off. The air is subsequently dispersed by the airflow direction plate 25 to the first air passageway 28 and the second air passageways 29. At this time, the sound of the air sent from the indoor fan 7 is absorbed by the acoustic material 32 attached to the airflow direction plate 25.

The air on the first air passageway 28 flows in the longitudinal direction of the airflow direction plate 25. When the air reaches the end portion 25a of the airflow direction plate 25, the air comes in contact with a side plate of the housing 6 and veers in the direction E. The inclined plates 26 disposed on the airflow direction plate 25 cause the air on each of the second air passageways 29 to pass through a corresponding one of the air vents 27, and the air flows from the cooling damper 31a to the cooling duct opening 15. In this case, the air that has passed through each of the air vents 27 from a corresponding one of the second air passageways 29 joins the air that has veered in the direction E from the first air passageway 28, flows from the cooling duct opening 15 via the cooling damper 31a, and is sent to the vehicle interior 52 via the air supply ducts 2.

In the case where the airflow direction plate 25 includes neither the air vents 27 nor inclined plates 26, air flows through only the first air passageway 28, and all of the air blown by the indoor fan 7 flows along the airflow direction plate 25. The distance from the indoor fan 7 to the first heating duct opening 16a is short, and, air is supplied to the first heating duct opening 16a accordingly. The distance from the indoor fan 7 to the second heating duct opening 16b is longer than the first air passageway, and consequently, air is unlikely to flow to the second heating duct opening 16b, resulting in a shortage of the amount of air.

According to Embodiment 1, as illustrated in FIG. 4, the angle of inclination of the inclined plate 26 closest to the end portion 25a of the airflow direction plate 25 is less than that of the other inclined plates 26, and hence air from a direction G is unlikely to enter the air vent 27, and the angle of inclination of the inclined plate 26 closest to the corner 5c of the airflow direction plate 25 is a large angle of 90 degrees, and hence air from a direction H is likely to enter the air vent 27. The angle of inclination of the inclined plates 26 gradually increases from the side of the end portion 25a of the airflow direction plate 25 to the side of the corner 5c of the partition plate 5a, and hence the balance of the amount of flowing air can be improved.

Adjustment of the angle of inclination of the inclined plates 26 enables adjustment of the amount of air on each of the second air passageways 29 and regulation of the airflow, and hence an even balance of the amount of air and a predetermined amount of air can be ensured at the position of the air supply duct opening 17 at which the first air passageway 28 and the second air passageways 29 merge with each other.

As illustrated in FIG. 1, the sound (noise energy) of the air sent from the indoor fan 7 is absorbed by the acoustic material 32 of the airflow direction plate 25 that faces the heater 24. The decreased noise subsequently reaches the air supply duct opening 17 via the first air passageway 28 and the second air passageways 29. Consequently, the noise energy is low at the air supply duct opening 17 of the indoor unit 5, and a noise that is transmitted to the vehicle interior 52 is reduced. As the amount of air is not adjusted by the indoor fan 7 but is adjusted by the shape of the airflow direction plate 25, the air-conditioning apparatus 1 for a vehicle can be compact and its costs can be reduced.

(Modification 1)

Figure 6:
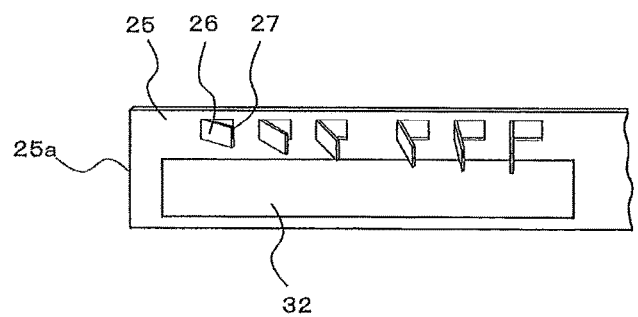
FIG. 6 is a perspective view of Modification 1 to an airflow direction plate in FIG. 1.

FIG. 6 is a perspective view of Modification 1 to the airflow direction plate in FIG. 1.

The number of the air vents 27 of the airflow direction plate 25 is four as an example but may be six as illustrated in FIG. 6, or other numbers. In this case, among the six inclined plates 26, the inclined plate 26 closest to the end portion 25a of the airflow direction plate 25 inclines at an angle of inclination less than that of the other inclined plates 26, and the inclined plate 26 closest to the corner 5c of the partition plate 5a inclines at a large angle of 90 degrees. The angle of inclination of the other inclined plates 26 gradually increases from the side of the end portion 25a of the airflow direction plate 25. The acoustic material 32 is attached to the lower portion of the airflow direction plate 25. With this configuration, the balance of the amount of flowing air can be better than in the case of the inclined plates 26 illustrated in FIG. 1, and the sound of the air sent from the indoor fan 7 is absorbed by the acoustic material 32, and hence the noise can be reduced.

(Modification 2)

Figure 7:
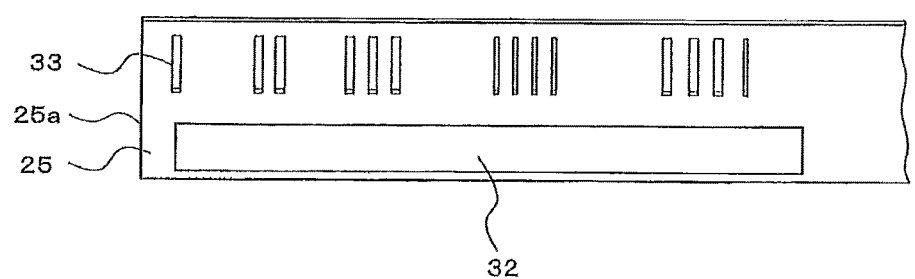
FIG. 7 is a perspective view of Modification 2 to the airflow direction plate in FIG. 1.

FIG. 7 is a perspective view of Modification 2 to the airflow direction plate in FIG. 1.

As illustrated in FIG. 1 and FIG. 6, the airflow direction plate 25 has the air vents 27, the inclined plates 26, and the acoustic material 32. As illustrated in FIG. 7, however, air vents 33 each having a slit shape elongated in the vertical direction may be formed in the airflow direction plate 25. One of the air vents 33 is disposed on the side of the end portion 25a of the airflow direction plate 25. The number of the air vents 33 increases as a position at which the air vents 33 are formed is closer to the corner 5c of the partition plate 5a. The four air vents 33 next to a set of the three air vents 33 have a width less than that of the other air vents 33. The rightmost air vent 33 of the four air vents 33 disposed on the side of the corner 5c of the partition plate 5a also has a narrow width. The acoustic material 32 is attached to the lower portion of the airflow direction plate 25.

In the case where the air vents 33 each having the slit shape are thus arranged, air from the direction G is unlikely to enter the air vent 33, and air from the direction H is likely to enter the air vent 33, as in the case of FIG. 4. Consequently, the balance of the amount of flowing air can be improved. In addition, the sound of the air sent from the indoor fan 7 is absorbed by the acoustic material 32, and hence the noise can be reduced.

(Modification 3)

Figure 8:
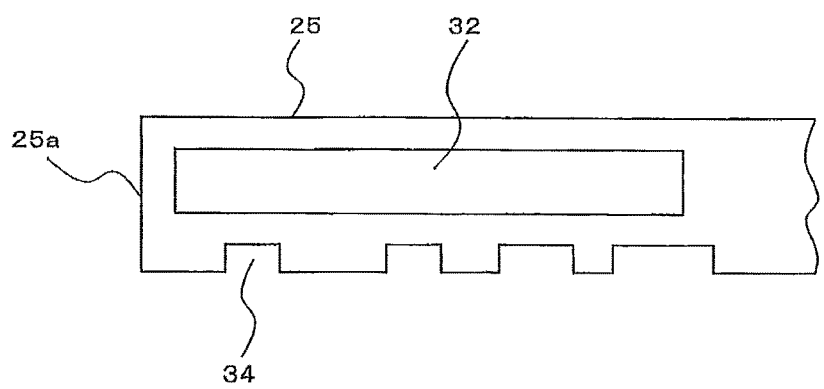
FIG. 8 is a perspective view of Modification 3 to the airflow direction plate in FIG. 1.

FIG. 8 is a perspective view of Modification 3 to the airflow direction plate in FIG. 1.

The airflow direction plate 25 has notch portions 34 at a contact portion with the housing 6, and the acoustic material 32 is attached to the upper portion of the airflow direction plate 25. The size of the notch portions 34 gradually increases from the side of the end portion 25a of the airflow direction plate 25 to the side of the corner 5c of the partition plate 5a. The configuration is to adjust the amount of air passing through the airflow direction plate 25.

With this configuration, air from the direction G is unlikely to enter the air vent 33, and air from the direction H is likely to enter the air vent 33, as in the case of FIG. 4. Consequently, the balance of the amount of flowing air can be improved. In addition, the sound of the air sent from the indoor fan 7 is absorbed by the acoustic material 32, and hence the noise can be reduced.

Embodiment 2

Embodiment 2 of the present invention will be described below with reference to FIG. 9.

Figure 9:
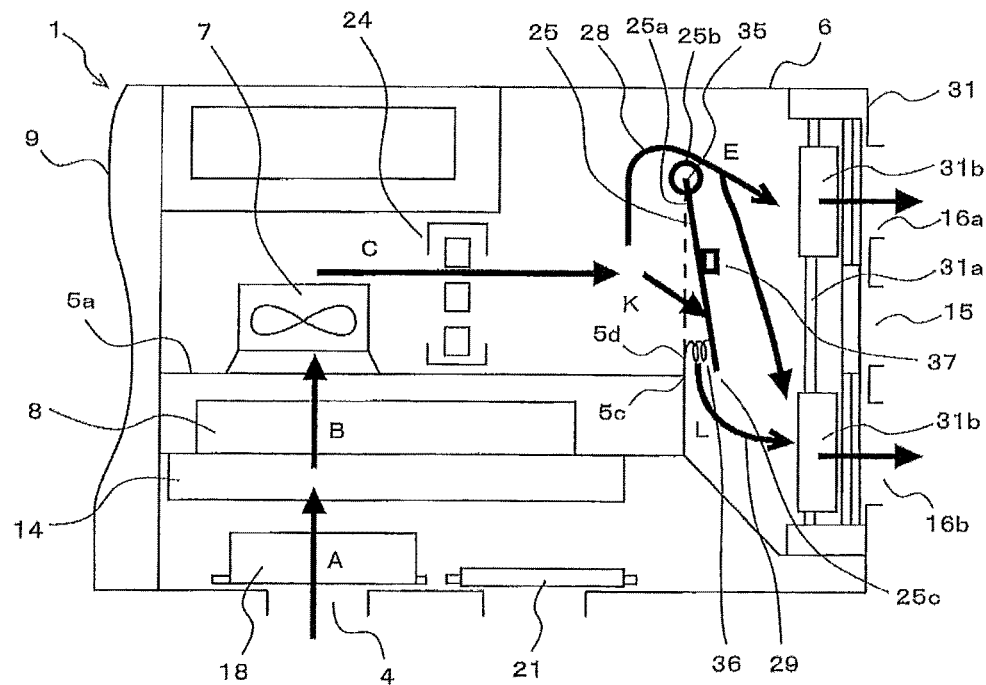
FIG. 9 is a plan view of an air-conditioning apparatus for a vehicle according to Embodiment 2 of the present invention illustrating the flow of circulating air in the indoor unit during heating operation.

FIG. 9 is a plan view of an air-conditioning apparatus for a vehicle according to Embodiment 2 of the present invention illustrating the flow of the circulating air 1b in the indoor unit during heating operation. Embodiment 2 is the same as Embodiment 1 except for the airflow direction plate 25.

A pivot 35 for the airflow direction plate 25 is disposed in the housing 6 of the indoor unit 5. The end portion 25a of the airflow direction plate 25 is attached to a rotating portion 25b in which the pivot 35 is inserted and is rotatable about the pivot 35. For example, a spring 36 is interposed to cause a distal end portion 25c of the airflow direction plate 25 and a protruding plate 5d disposed at the corner 5c of the partition plate 5a to face each other. A restricting member 37 that restricts the range of the opening degree of the airflow direction plate 25 is attached in the housing 6. The acoustic material 32 is attached to the surface of the airflow direction plate 25 closer to the heater 24.

When the airflow direction plate 25 is pressed in a direction K by a wind pressure produced by operating the indoor fan 7, the airflow direction plate 25 opens about the pivot 35 toward the air supply damper 31 and is stopped by the restricting member 37. At this time, a space between the distal end portion 25c of the airflow direction plate 25 and the protruding plate 5d of the partition plate 5a becomes wider, air flows in a direction L from the space, and the second air passageway 29 is formed. When the operation of the indoor fan 7 is stopped to remove the wind pressure, the airflow direction plate 25 returns to the original position due to the restoring force of the spring 36, and the space between the airflow direction plate 25 and the protruding plate 5d becomes narrower, and thus the second air passageway 29 is closed.

With the above configuration, the same effects as in Embodiment 1 can be achieved, and the noise can be reduced. To adjust the amount of air, the balance of the amount of air can be ensured by adding the inclined plates 26 and the air vents 27 to the airflow direction plate 25 as in Embodiment 1.

Embodiment 3

Embodiment 3 of the present invention will be described with reference to FIG. 10.

Figure 10:
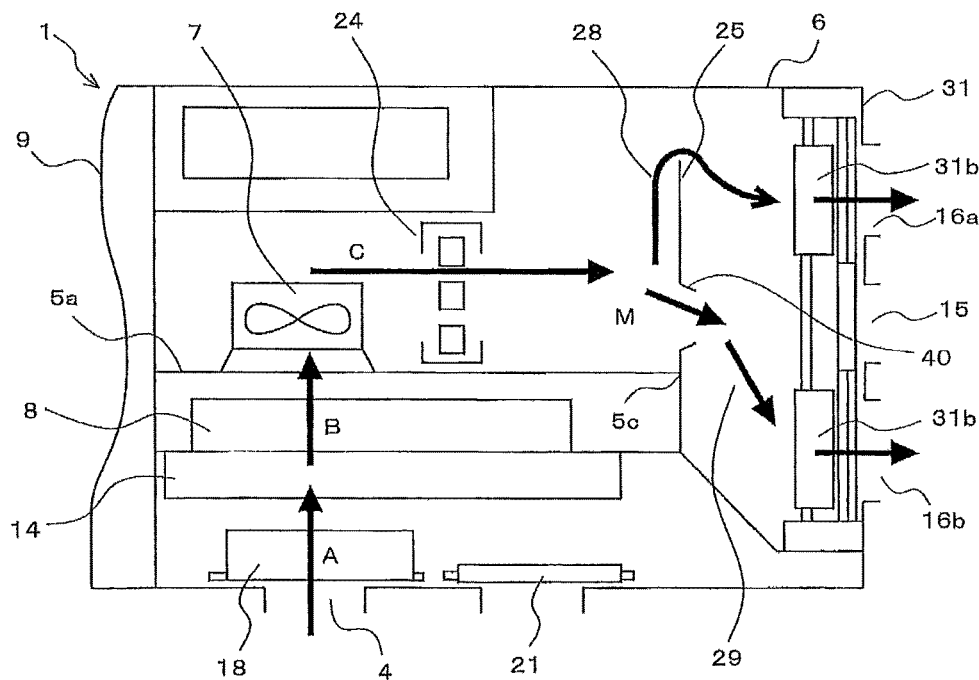
FIG. 10 is a plan view of an air-conditioning apparatus for a vehicle according to Embodiment 3 of the present invention illustrating the flow of circulating air in the indoor unit during heating operation.

FIG. 10 is a plan view of an air-conditioning apparatus for a vehicle according to Embodiment 3 of the present invention illustrating the flow of the circulating air 1b in the indoor unit during heating operation. Embodiment 3 is the same as Embodiment 1 except for the airflow direction plate 25.

An air channel bellmouth 40 is disposed on the airflow direction plate 25 on the side of the corner 5c of the partition plate 5a. The indoor fan 7 is operated to cause a part of air blown from the indoor fan 7 to flow in a direction M with the air channel bellmouth 40, and the second air passageway 29 is formed. That is, the part of the air blown from the indoor fan 7 flows from the air channel bellmouth 40 to cause air to flow to the vicinity of the second heating duct opening 16b, to which a small amount of air flows.

Consequently, a shortage of the amount of air at the second heating duct opening 16b can be solved. In the case where the air channel bellmouth 40 is disposed on the airflow direction plate 25, the airflow can be regulated, and a sound reduction can be achieved. In addition, the noise can be reduced because the acoustic material 32 is attached to the airflow direction plate 25. To adjust the amount of air, the amount of air can be made uniform and the airflow can be regulated by providing the air vents 27 and the inclined plates 26 to the airflow direction plate 25 as in Embodiment 1.

The airflow direction plate 25 may be made of a material ranging from a metallic material to a plastic material and a flexible material that have high sound absorbency as an alternative material to the acoustic material 32 of the airflow direction plate 25, and the same effects as Embodiment 1, Embodiment 2, and Embodiment 3 can be expected.

REFERENCE SIGNS LIST

1 air-conditioning apparatus for a vehicle 1a cold air 1b circulating air 1c hot air 2 air supply duct 3 return duct 4 return inlet 5 indoor unit 5*a* partition plate 5*b* inlet 5*c* corner 5*d* protruding plate 6 housing 6*a*, 6*b* side plate 7 indoor fan 8 evaporator 9 outdoor unit 10 housing 11 outdoor fan 12 condenser 13 compressor 14 dust collection filter 15 cooling duct opening 16*a* first heating duct opening 16*b* second heating duct opening 17 air supply duct opening 18 return damper 19 return filter 21 outdoor-air drawing damper 22 fresh filter 23 outdoor-air inlet 24 heater 25 airflow direction plate 25*a* end portion 25*b* rotating portion 25*c* distal end portion 26 inclined plate 27 air vent 28 first air passageway 29 second air passageway 30 electrical box 31 air supply damper 31*a* cooling damper 31*b* heating damper 32 acoustic material 33 air vent having a slit shape 34 notch portion 35 pivot 36 spring 37 restricting member 40 air channel bellmouth 50 vehicle 51 roof 52 vehicle interior 60 defroster air communication hole 61 box-shaped housing 62 air suction port 63 U-shaped airflow direction plate 63*a* hole 64 windshield 65 jet of airflow 70 airflow direction plate for a motor vehicle 71 fan for a motor vehicle 72 cooling heat exchanger 73 cooling bypass air passageway 74 heater for a motor vehicle 75 heating air passageway 76 partition plate 77 air space

The invention claimed is:

1. An air-conditioning apparatus for a vehicle, comprising:
   an indoor unit including an evaporator, an indoor fan, a return inlet from which air from the vehicle is drawn, and an air supply duct opening through which the air is supplied to the vehicle, the indoor unit being configured to operate the indoor fan to cause the air in the vehicle to flow from the return inlet to the evaporator and send the air passing through the evaporator to the air supply duct opening;
   an outdoor unit including a compressor, a condenser, and an outdoor fan and configured to form a refrigeration cycle together with the indoor unit; and
   an airflow direction plate elongated in a direction perpendicular to a direction of an air flow from the indoor fan and disposed between the indoor fan in the indoor unit and the air supply duct opening,
   the airflow direction plate having
   air vents arranged in a longitudinal direction,
   inclined plates each disposed to a corresponding one of the air vents, having different angles of inclination corresponding to positions of the air vents, and adjusting an amount and a speed of the air from the indoor fan, and
   an acoustic material disposed on a surface facing the indoor fan,
   the indoor unit having a first air passageway allowing the air from the indoor fan to flow in the longitudinal direction of the airflow direction plate for a detour to the air supply duct opening and a second air passageway allowing the air from the indoor fan to flow into the air vents along the inclined plates.

2. An air-conditioning apparatus for a vehicle, comprising:
   an indoor unit including an evaporator, an indoor fan, a return inlet from which air from the vehicle is drawn, and an air supply duct opening through which the air is supplied to the vehicle, the indoor unit being configured to operate the indoor fan to cause the air in the vehicle to flow from the return inlet to the evaporator and send the air passing through the evaporator to the air supply duct opening;
   an outdoor unit including a compressor, a condenser, and an outdoor fan and configured to form a refrigeration cycle together with the indoor unit;
   an airflow direction plate elongated in a direction perpendicular to a direction of an air flow from the indoor fan, disposed between the indoor fan in the indoor unit and the air supply duct opening, and configured to open about an end portion of the airflow direction plate toward the air supply duct opening using an air pressure from the indoor fan; and
   a restricting member for restricting a range in which the airflow direction plate is movable,
   the airflow direction plate including an acoustic material disposed on a surface facing the indoor fan,
   the indoor unit having a first air passageway allowing the air from the indoor fan to flow in the longitudinal direction of the airflow direction plate for a detour to the air supply duct opening and a second air passageway allowing the air from the indoor fan to flow through the second air passageway when an other end portion of the airflow direction plate is released using the air pressure from the indoor fan.

3. An air-conditioning apparatus for a vehicle, comprising:
   an indoor unit including an evaporator, an indoor fan, a return inlet from which air from the vehicle is drawn, and an air supply duct opening through which the air is supplied to the vehicle, the indoor unit being configured to operate the indoor fan to cause the air in the vehicle to flow from the return inlet to the evaporator and send the air passing through the evaporator to the air supply duct opening;
   an outdoor unit including a compressor, a condenser, and an outdoor fan and configured to form a refrigeration cycle together with the indoor unit; and
   an airflow direction plate elongated in a direction perpendicular to a direction of an air flow from the indoor fan and disposed between the indoor fan in the indoor unit and the air supply duct opening,
   the airflow direction plate including an opening port having a bellmouth shape and an acoustic material disposed on a surface facing the indoor fan,
   the indoor unit having a first air passageway allowing the air from the indoor fan to flow in the longitudinal direction of the airflow direction plate for a detour to the air supply duct opening and a second air passageway allowing the air from the indoor fan to flow into the opening port.

4. The air-conditioning apparatus for a vehicle of claim 1, wherein the air vents of the airflow direction plate each have a slit shape, and the amount and the speed of the air are adjusted corresponding to the number and a size of the air vents each having the slit shape.

5. The air-conditioning apparatus for a vehicle of claim 1, wherein the air vents of the airflow direction plate are notch portions each notched in a lower portion of the airflow direction plate, and the amount and the speed of the air are adjusted corresponding to a magnitude of an area of each of the notch portions.

6. The air-conditioning apparatus for a vehicle of claim 1, wherein the acoustic material is made of a plastic material having sound absorbency or a flexible body having sound absorbency.

7. The air-conditioning apparatus for a vehicle of claim 2, wherein the acoustic material is made of a plastic material having sound absorbency or a flexible body having sound absorbency.

8. The air-conditioning apparatus for a vehicle of claim 3, wherein the acoustic material is made of a plastic material having sound absorbency or a flexible body having sound absorbency.

* * * * *